No. 861,297. PATENTED JULY 30, 1907.
D. & K. LEWIS.
COOKING PAN.
APPLICATION FILED MAR. 28, 1907.

Witnesses.

Inventors.
DANIEL LEWIS
KATHARINE LEWIS
by
W. T. Mil——
Atty.

THE NORRIS PETERS CO., WASHINGTON, D. C.

UNITED STATES PATENT OFFICE.

DANIEL LEWIS AND KATHARINE LEWIS, OF BUFFALO, NEW YORK.

COOKING-PAN.

No. 861,297.  Specification of Letters Patent.  Patented July 30, 1907.

Application filed March 28, 1907. Serial No. 364,996.

*To all whom it may concern:*

Be it known that we, DANIEL LEWIS and KATHARINE LEWIS, citizens of the United States, residing at Buffalo, in the county of Erie and State of New York, have invented certain new and useful Improvements in Cooking-Pans; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to improvements in cooking-pans for roasting or baking and more particularly to that type which involves a pan and cover, the bottom of the pan being held away from contact with the heating surface upon which such pan rests.

The objects of our invention are to simplify the construction, increase the durability and cheapen the cost of production of the pan.

To these ends our invention consists of a pan struck up from one piece of sheet-metal, having a rounded vertical side-wall with a lower off-set portion, a bowl-shaped bottom and a supporting-flange for holding the bowl-shaped bottom away from contact with the heating surface upon which the pan rests, such supporting-flange extending below the bottom and being formed by doubling over upon itself, into the off-set portion, the side-wall of the pan, below its line of junction with the bowl-shaped bottom.

Our invention further consists of certain details of construction, all of which will be fully hereinafter described and claimed.

Figure 2:
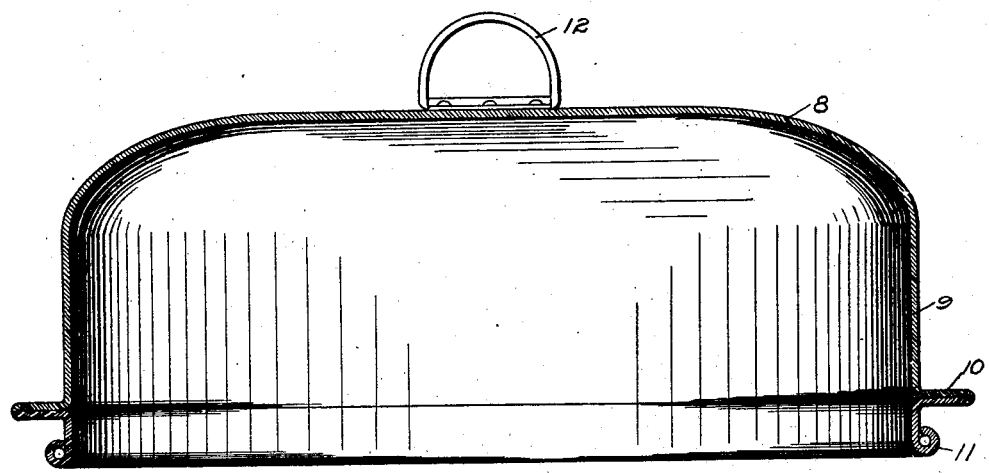
Figure 1:
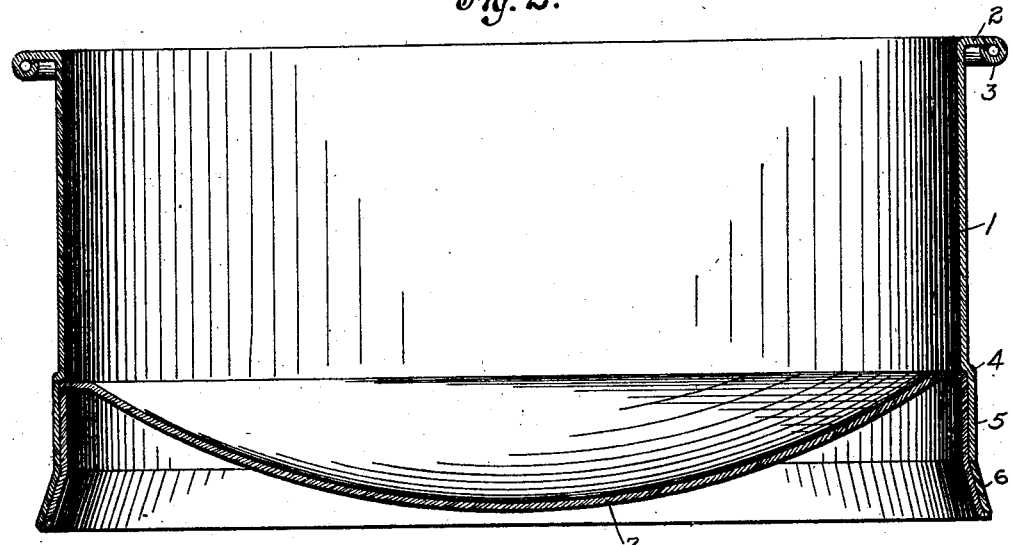

In the drawings, Figure 1 is a central vertical section of our improved pan. Fig. 2 is a similar section of the cover.

Referring to the drawings, 1 is the rounded vertical side-wall of our improved pan, preferably cylindrical in configuration, to save waste in cutting from the blank, but such side-wall may be oval or elliptical, if preferred. Its upper edge is bent out at right-angles to form the horizontal shelf 2, upon which the cover rests, its extreme outer edge being curled to form the strengthening bead 3, on the under side of the supporting shelf 2.

The lower portion of the side-wall 2 is preferably off-set, as at 4. The supporting-flange 5 is formed by doubling over upon itself, into the off-set portion, the side-wall 1 of the pan, the lower edge of the doubled portion forming the supporting-flange, being preferably bent outwardly to form the flaring portion 6, which serves to increase the rigidity of the supporting-flange.

The bottom 7 of the pan is preferably bowl-shaped, its line of junction with the side-wall 1 of the pan being at the upper edge of the off-set portion and extending into the same, to form a tight joint. The bottom 7 of the pan is raised a short distance from the plane of the lower edge of the supporting-flange, in order that such bottom may be held away from contact with the heating surface upon which such pan rests, in order that the burning of the contents of the pan may be prevented.

As clearly shown, all of the parts of our improved pan, just described, are formed from a single piece of sheet-metal, thus producing a one-piece pan, possessing increased rigidity and stability. The cover is also formed from one piece of sheet-metal comprising a rounded top 8, rounded vertical side-wall 9, an outwardly extended horizontal flange 10, formed by bending over upon itself, a portion of the side-wall of the cover and an outside bead 11, formed by curling over the lower edge of the cover. This bead 11 is adapted for snug frictional contact with the inner surface of the side-wall 1 of the pan and the horizontal flange 10 rests upon the horizontal shelf 2 of the pan and supports such cover in position upon the pan. The cover is provided with the usual handle 12.

The construction of the cover, just outlined, possesses no patentable novelty, our invention residing entirely in the peculiar construction of the pan, hereinbefore specifically described.

It will be observed that our improved pan has no crevices or spaces, either inside or outside, in which grease or dirt can lodge, thus making it a perfectly sanitary cooking pan.

We claim.

1. A cooking pan struck up from one piece of sheet-metal, having a rounded vertical side-wall with a lower off-set portion, a bowl-shaped bottom and a supporting-flange for holding the bowl-shaped bottom away from contact with the heating surface upon which the pan rests, such supporting-flange extending below the bottom and being formed by doubling over upon itself, into the off-set portion, the side-wall of the pan, below its line of junction with the bowl-shaped bottom.

2. A cooking pan struck up from one piece of sheet-metal, having a rounded vertical side-wall with a lower off-set portion, a bowl-shaped bottom and a supporting-flange with outwardly flaring lower edge for holding the bowl-shaped bottom away from contact with the heating surface upon which the pan rests, such supporting-flange extending below the bottom and being formed by doubling over upon itself, into the off-set portion, the side-wall of the pan, below its line of junction with the bowl-shaped bottom.

In testimony whereof, we have signed our names to this specification, in the presence of two subscribing witnesses.

DANIEL LEWIS.
KATHARINE LEWIS.

Witnesses:
W. T. MILLER,
D. FORD.